April 15, 1930.  A. KINGSBURY  1,754,325

BEARING

Filed April 8, 1927  4 Sheets-Sheet 1

Inventor
Albert Kingsbury
By Cameron, Kerkam & Sutton
Attorneys

April 15, 1930.  A. KINGSBURY  1,754,325

BEARING

Filed April 8, 1927  4 Sheets-Sheet 2

Inventor
Albert Kingsbury
By Cameron, Kirkam & Sutton
Attorneys

April 15, 1930.  A. KINGSBURY  1,754,325
BEARING
Filed April 8, 1927   4 Sheets-Sheet 3

Inventor
Albert Kingsbury
By
Cameron, Kerkam & Sutton
Attorneys

April 15, 1930.  A. KINGSBURY  1,754,325
BEARING
Filed April 8, 1927  4 Sheets-Sheet 4
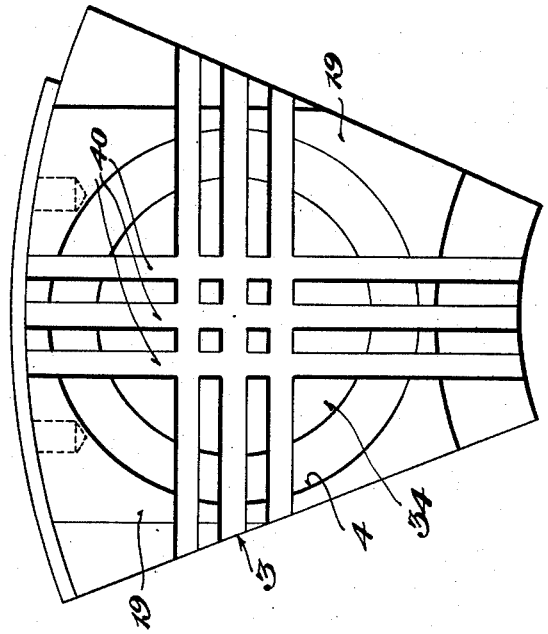
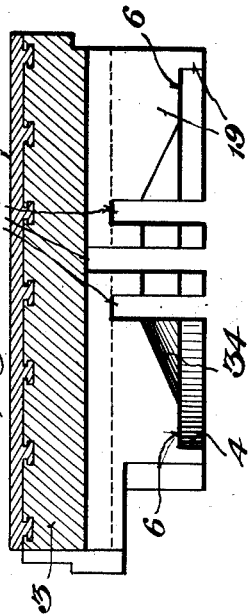
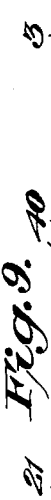
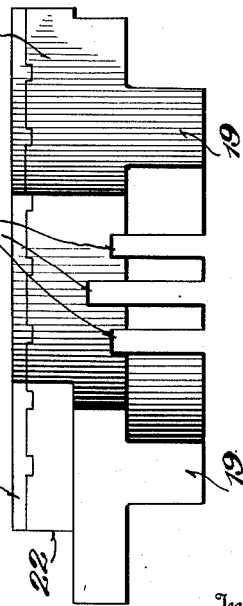
Inventor
Albert Kingsbury
By
Cameron, Kirkam & Sutton
Attorneys Patented Apr. 15, 1930

1,754,325

UNITED STATES PATENT OFFICE

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE

BEARING

Application filed April 8, 1927. Serial No. 182,112.

This invention relates to bearings, particularly to bearings of the type employing bearing segments or shoes flexibly or pivotally mounted to facilitate the formation of oil films between the relatively movable bearing surfaces.

It is an object of this invention to provide an improved thrust bearing of the type employing flexibly or pivotally mounted bearing segments or shoes which is particularly adapted for use in conjunction with shafts having relatively high rotative speed.

Another object of this invention is to provide an improved thrust bearing of the type employing flexibly or pivotally mounted bearing segments or shoes which is particularly adapted for use with relatively high unit pressures.

Another object of this invention is to provide a bearing of the type employing flexibly or pivotally mounted bearing segments or shoes with an improved construction of segment or shoe whereby distortion, as crowning for example, may be minimized or prevented.

Another object of this invention is to provide a bearing of the type employing flexibly or pivotally mounted bearing segments or shoes wherein provision is made for circulation of the oil through the body of the segment or shoe so as to facilitate abstraction of heat therefrom.

Another object of this invention is to provide a bearing of the type employing flexibly or pivotally mounted bearing segments or shoes wherein compensation for the initial pressure at the leading edge of a segment or shoe is made use of to reduce the area of the bearing surface of said segment or shoe.

Other objects will appear as the description of the invention proceeds.

The invention is capable of receiving a variety of mechanical expressions, two of which are shown on the accompanying drawings, but it is to be expressly understood that the drawings, are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is a fragmentary half axial section of a thrust bearing embodying the present invention;

Fig. 7 is a plan view of the bearing segment or shoe of Fig. 6;

Fig. 8 is an inverted plan view of said segment or shoe;

Fig. 9 is an inside end view of said segment or shoe looking radially outward from the shaft;

Fig. 10 is a cross section of said segment or shoe; and

Figure 1:
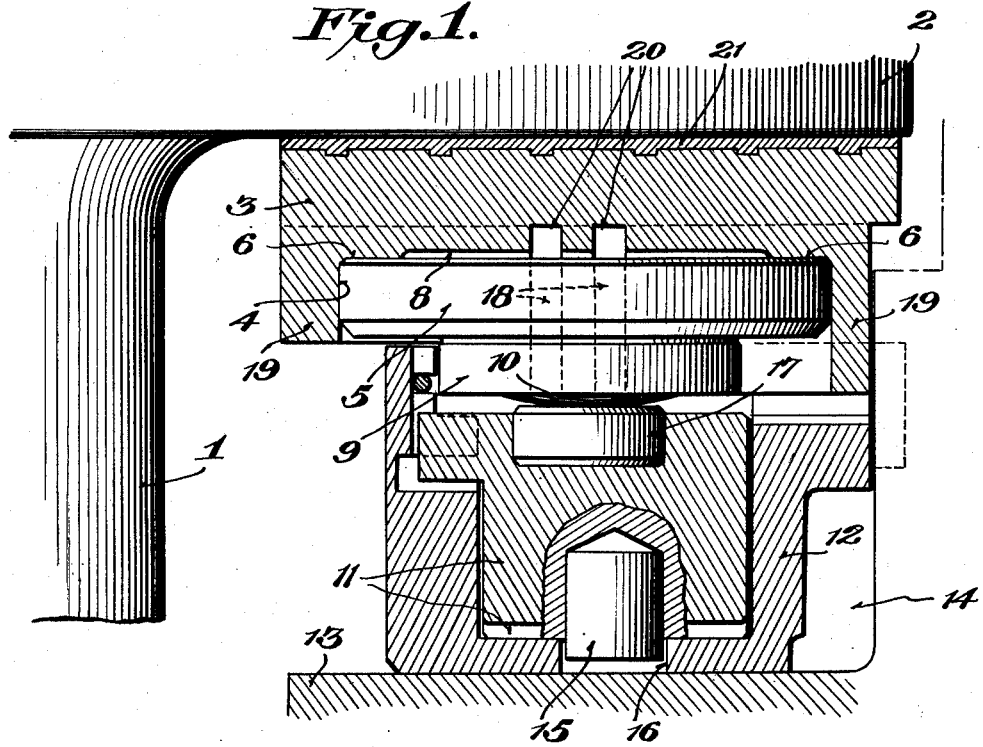

In the form shown in Figs. 1 to 5, 1 is any suitable shaft, whether horizontal, vertical or inclined, but shown as a vertical shaft carrying, or connected in any suitable way to, a thrust collar 2. Cooperating with the bearing surface of said thrust collar is a suitable number of bearing segments or shoes 3, each segment being suitably mounted to provide for the tilting of the same circumferentially of the axis of the bearing, to facilitate the formation of oil films between the bearing surfaces, and also preferably so mounted that it may tilt radially with respect to the axis of the bearing in order to maintain proper radial relation between said bearing surfaces.

In conformity with one feature of this invention where the unit pressures are to be relatively high, each bearing segment is provided with a recess 4 in its rear face to receive a pressure-distributing block 5 which engages the bottom of said recess around the peripheral portion 6 thereof, the central portion of the bottom surface of said recess being relieved as shown at 8 so as to be out of contact with the central portion of the forward face of said block, or said block may be relieved at its central portion. In the form shown, each pressure-distributing block 5 has a rearwardly projecting central boss 9 which has a rear spherically curved surface 10, although said spherical surface may be provided on the member with which the rear face of said boss engages. Owing to the spherical surface 10 the bearing segment 3 with its pressure-distributing block 5 may tilt in all directions, both circumferentially and radially of the axis of the bearing.

Said bearing segments 3 are preferably mounted on means for effecting an equitable distribution of pressure between the several bearing segments. Any one of a wide variety of equalizing means may be employed. In the form shown, said equalizing means takes the form of a bridged series of overlapping equalizing plates 11 suitably retained within a channel-shaped ring or ring segment 12 carried by a base 13 within an oil well 14, all of which may be of any suitable construction. Alternate equalizing plates 11, which contact with the bottom of the ring 12, are shown as provided with dowels 15 which loosely engage in apertures 16 provided in the bottom of said ring, and the intermediate or bridging equalizing plates 11, which carry the bearing segments 3, are provided with hardened inserts 17 for engagement with the spherical faces 10 on the pressure-distributing blocks 5.

Figure 5:
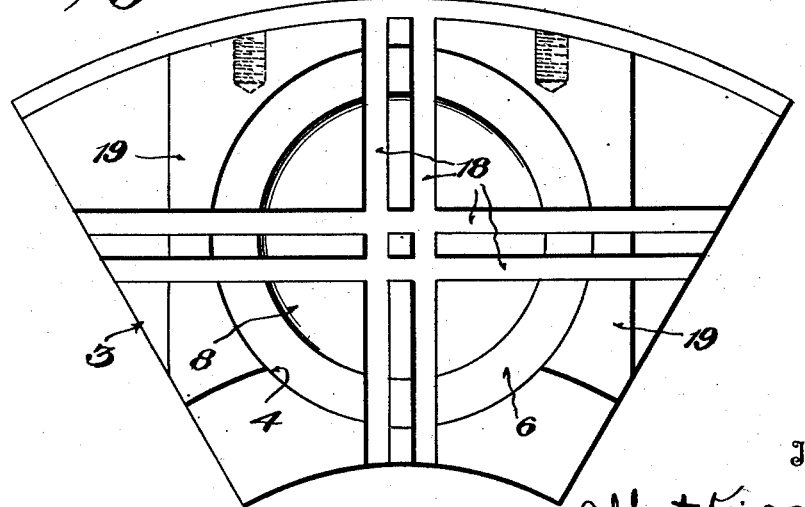
Fig. 5 is an inverted plan view of said segment or shoe.

Particularly where the unit pressures are relatively high, the difference in temperature between the bearing face of a bearing segment and the rear face thereof is likely to be productive of a distortion of the bearing segment, resulting in a crowning of the bearing surface and a consequent tendency for said bearing surface to wear locally. In order to minimize this tendency for the bearing segment to distort, the rear of said segment, in accordance with one feature of this invention, is provided with a plurality of grooves or saw cuts 18. As shown in Fig. 5, these grooves traverse the segment in a radial direction, and in a direction at right angles thereto, preferably intersecting at or adjacent the central portion of the segment. Any suitable number of these grooves may be employed, Fig. 5 illustrating two of such grooves in each direction. These grooves 18, in the direction of the thickness of the segment, not only traverse the skirt portions 19 which surround the recess 4, but also preferably extend a substantial distance into the body of the segment between the recess 4 and the bearing face thereof, as shown at 20 in Figs. 1 and 4. As these grooves extend to the periphery of the segment, they are open for the free circulation of oil therethrough, and therefore these grooves not only weaken the segment at its rear to minimize distortion or crowning of the segment at its bearing face, but they also afford circulation of the oil through the body of the segment, both radially and circumferentially thereof, to facilitate abstraction of heat therefrom.

The bearing segment may be constructed of any suitable metal, but where the quantities of heat to be dissipated are relatively large, one feature of the present invention is the construction of each bearing segment of copper or other metal or alloy of high heat-conductivity, preferably with a surface layer of Babbitt metal 21 suitably attached thereto.

In conformity with another feature of the present invention the bearing face of the segment or shoe is cut away adjacent the leading edge, i. e., that edge first approached by any given point on the surface of the rotating thrust collar, as shown at 22.

Figure 11:
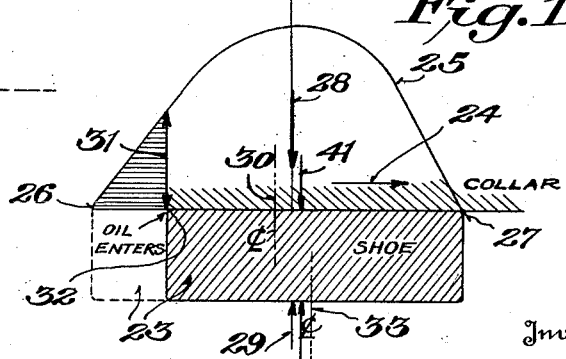
Fig. 11 is a diagrammatic view to illustrate the pressure distribution with a segment or shoe embodying one feature of the present invention.

Referring to Fig. 11 and assuming a bearing segment or shoe 23 embracing both the full line and the dotted line rectangles, and assuming that the collar is rotating at low speed in the direction of the arrow 24, the pressure in the oil film existing between the face of the shoe and the face of the collar is graphically represented by the curve 25 which is substantially a parabola distorted so that its highest point is beyond the center of the shoe, with its legs resting on the leading edge 26 and the trailing edge 27 of the shoe. The resultant of this pressure is designated by the arrow 28 and the support of the shoe, in alignment with said resultant, by the arrow 29. This resultant is beyond the center line 30 of said shoe, toward the trailing end 27 thereof.

The rotation of the thrust collar 2 in a high speed bearing is productive of a substantial velocity in the oil in contact with the collar and contiguous thereto, in the radial spaces between the shoes, and as only a relatively small proportion of the moving oil passes into the oil films, the remainder of the moving oil is deflected by the leading vertical faces of the shoes. The deflection of the moving oil by the leading face of a shoe produces a pressure at the leading edge thereof which, for a shoe extending from 32 to 27, in Fig. 11, may be designated in magnitude by the double arrow 31. There is a point in the pressure curve 25 for the long shoe 26—27, operating at low speed, where the pressure is equal to this magnitude 31, and if the bearing face of the long shoe is cut away until the leading edge is positioned at 32 opposite this point on the curve 25, then at the high speed, which is determinable, the pressure distribution in the film from this new leading edge 32 to the trailing edge 27 would be substantially represented by the curve 31—25—27. This would be exactly true, however, only if the film shape of the short shoe at high speed is identical with the trailing end of the film shape for the long shoe at low speed, and to make this possible the resultant pressure for the short shoe film would have to be located at the right of the long shoe resultant 29, as at 41, so as to allow for the removal of the moment of the pressures between 26 and 32. The position of the new resultant 41 might be between 29 and 33 as illustrated, or it might be to the right of 33, its distance to the right of 29 varying with the bearing speed.

Figure 2:
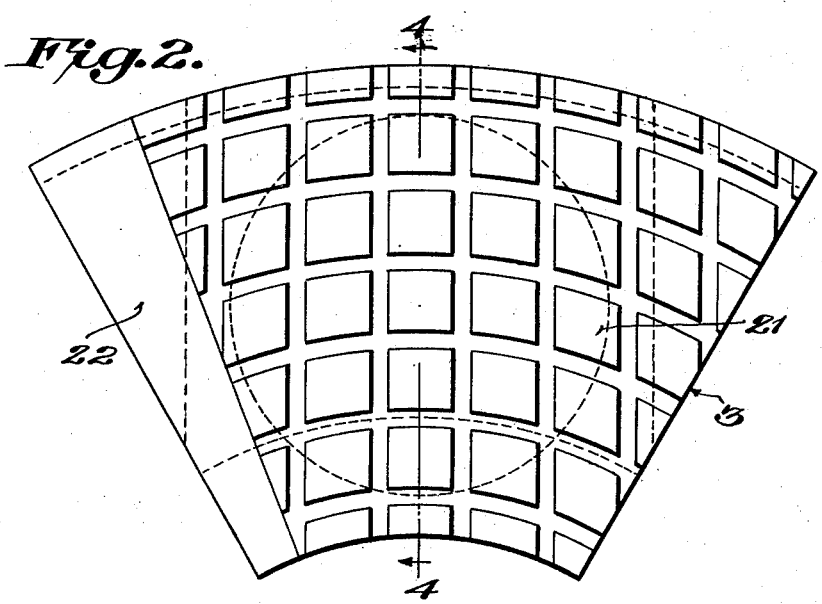
Fig. 2 is a plan view of the bearing segment or shoe of the embodiment of Fig. 1 but with the babbitt face removed, showing the babbitt anchor-grooves which may be used when the babbitt is tinned to the segment or shoe.
Figure 3:
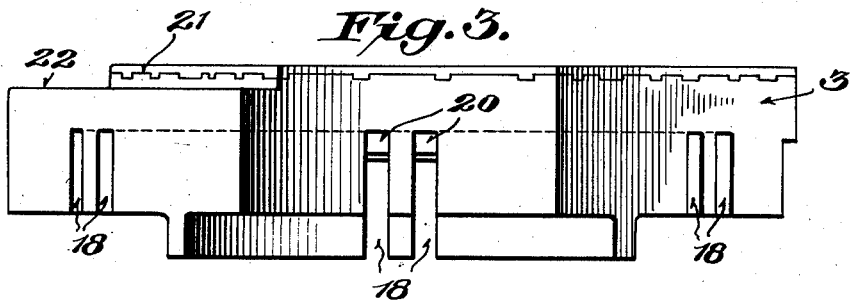
Fig. 3 is an inside end view of said bearing segment or shoe, looking radially outward from the shaft.
Figure 4:
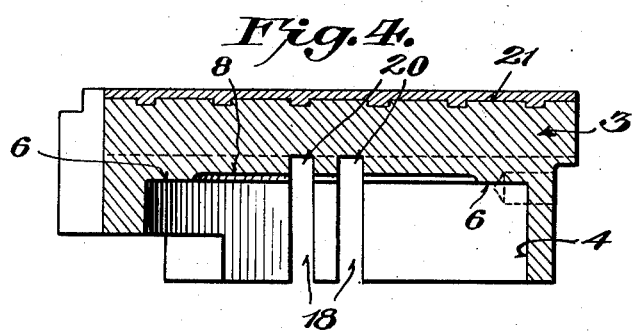
Fig. 4 is a radial cross section, on the line 4—4 of Fig. 2 but with the babbitt face in place.

Advantage is taken of the above described facts by the present invention and for high speed operation the leading edge of the shoe up to the radial line 32 may be cut away, or advanced toward the center line of the long shoe, leaving the shoe as shown by the full line rectangle in Fig. 11, or only the leading edge of the bearing face of the shoe may be cut away to this line, as shown at 22 in Figs. 2 and 3. Again referring to Fig. 11, the resultant of the pressure is now represented by the arrow 41 and the support by the arrow 42, but the center line of the shoe, or of its bearing face, is advanced toward the trailing edge thereof by one-half the width of the cut away portion, and may pass the resultant pressure, so that the center line of the shoe, or of its bearing face, may now be on the trailing edge side of the resultant pressure, as shown at 33. Therefore a bearing shoe constructed in accordance with this feature of the present invention, while having its support off-set with respect to the center line of the shoe, or its bearing face, may have a short leading angle and a long trailing angle, that is the distance from the leading edge to the center line of support may be less than the distance from said line to the trailing edge, instead of vice versa as heretofore employed with off-set shoes.

This feature of the invention is applicable to journal bearings, employing pivotally or flexibly mounted bearing segments or shoes, as well as to thrust bearings, and Fig. 11 may be taken as illustrating journal bearing surfaces developed into a single plane and embodying this feature of the invention, as well as thrust bearing surfaces.

Figure 6:
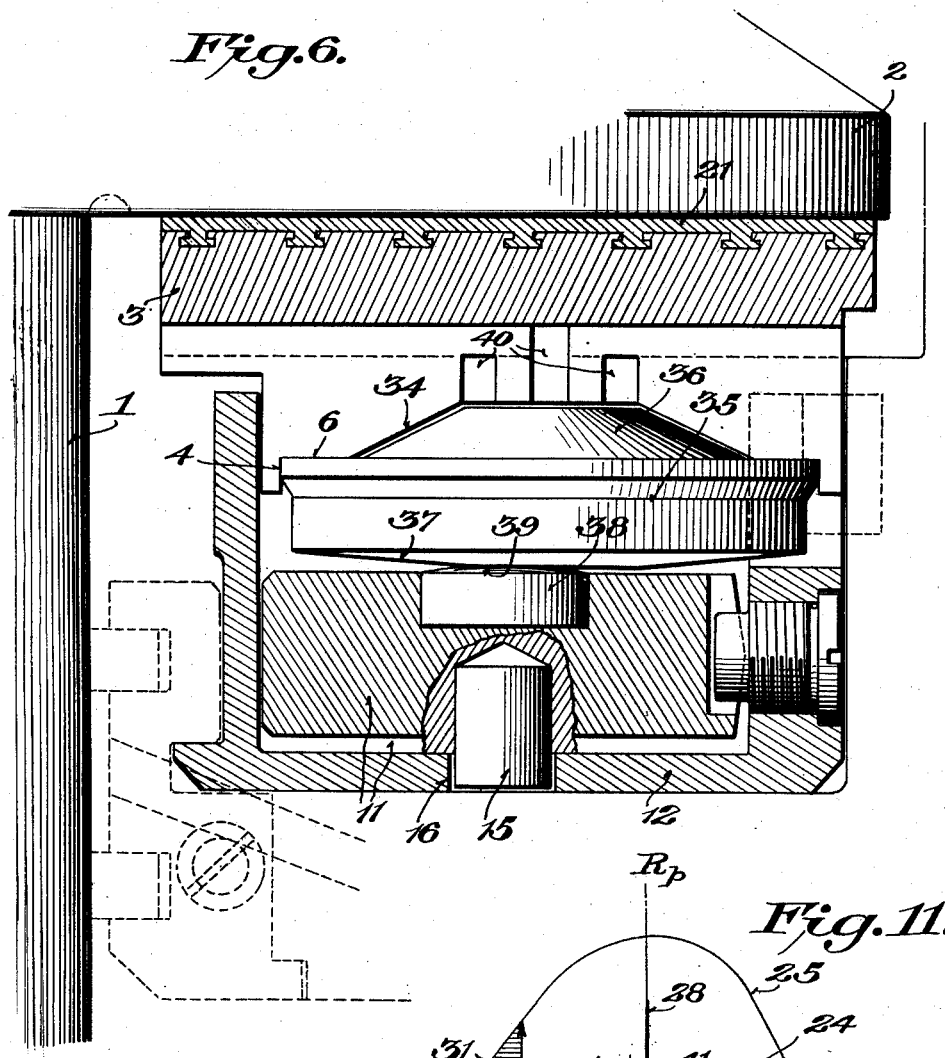
Fig. 6 is a fragmentary half axial section of another embodiment of the present invention.

In the form shown in Figs. 6 to 10, wherein the same reference characters are employed to designate the main elements of the bearing structure, the recess 4 in the rear of each bearing segment is provided with a centrally arranged extension 34 of truncated conical shape and the pressure-distributing block 35 has a forward extension 36 of truncated conical form which is received within the recess extension 34. The block extension 36 is out of contact with the walls of the recess extension 34 when the parts are in position, the body of the segment engaging the pressure-distributing block 35 only at the peripheral portion 6 of the forward face of the body of said block. In this form the block 35 is also provided with a rear surface 37 in the form of a truncated conical surface, and each of the hardened inserts 38 carried by the equalizing plates 11 have a spherical surface 39 to provide the universal pivot for the combined segment and pressure-distributing block hertofore described. This embodiment illustrates another feature of this invention, i. e. the support of the segment radially inward of the center of figure of its bearing surface. In Fig. 6 it will be observed that the center line of the block 35, is radially outside of its center of contact with the insert 38. As the moments of oil film pressures must be balanced radially with respect to the line of support, the radially-inward offset of the line of support reduces the pressure adjacent the radially-outer edge of the segment, where the speed is higher, and increases the pressure adjacent the radially-inner edge of the segment, where the speed is lower, and this tends to equalize the temperature rise in these respective parts of the oil film.

In the form shown in Figs. 8, 9 and 10, the rear of the segment is provided with two sets of three grooves 40 which extend radially thereof and at right angles thereto. These grooves not only extend into the body of the segment forward of the recess provided for the pressure-distributing block, but they may extend to unequal distances as shown in said figures, wherein the center groove of each group of three extends into the body of the segment to a greater distance than the grooves at the sides thereof.

It will therefore be perceived that a bearing of the type employing flexibly or pivotally mounted bearing segments or shoes has been provided which is suitable for use at relatively high speeds and with relatively high unit pressures. The bearing segments or shoes have been so constructed as to minimize or eliminate the distortion heretofore attendant upon the use of high unit pressures, because not only is the pressure on each segment transmitted to the pressure-distributing block over an extended area intermediate the center and the periphery of the segment, but the segment has been weakened by the use of the grooves or saw cuts heretofore described, so that differences in temperature are less effective for producing a crowning of the surface of the segment, while the circulation of oil through these grooves, both radially and circumferentially of the axis of the bearing, is effective in abstracting heat from the body of each segment. On the other hand, the bearing surface of each shoe has been materially decreased in a circumferential direction, and the circumferential length of the shoe may be correspondingly decreased, although it is preferred to retain the body of the shoe of a length greater than that of the bearing face and position the pressure-distributing block or other support centrally thereof.

While particular arrangements of grooves in the rear of the segments or shoes have been illustrated and described it is to be expressly understood that the invention is not restricted thereto, as each segment or shoe may be provided with a wide variety of other arrangements of grooves, preferably intersecting, and of varying number, size, depth and angularity. Moreover the invention, in its broader aspects, is not limited to the use of grooves cut inwardly from the rear surface of the segment as the passages for circulating oil in heat-abstracting relation to the segment, as these passages may take the form of drilled or otherwise suitably formed passages within the confines of the segment, in which event these passages would not render the segment flexible as heretofore described but they would still be effective to abstract heat from the body of the segment. Other forms of pressure-distributing blocks may also be used. While only the bearing face of the shoe has been shown as cut away at the leading edge, the entire body of the shoe may be cut away if desired, i. e., initially designed of shorter circumferential length and supported in conformity with the principles of the invention heretofore explained, or the shoe may be reduced in circumferential length for a portion of the distance by which the bearing surface is cut away. Other forms of equalizing means may be employed, and the segments or shoes may be flexibly connected within the purview of this invention. Various other exemplifications of the invention will now readily suggest themselves to those skilled in the art and certain features may be used without other features; for example, shoes having their leading edges cut away may be employed with other type of shoe structure and shoe mounting, and the novel shoe construction may be employed without cutting away the leading edge, etc. Changes may also be made in the details of construction, arrangement and proportion of parts without departing from the spirit of this invention. Reference is therefore to be had to the appended claims for a definition of said invention.

What is claimed is:

1. In a bearing, relatively rotatable bearing members including one or more bearing segments weakened at their backs by a plurality of passages through which oil may circulate.

2. In a bearing, relatively rotatable bearing members including one or more bearing segments weakened at their backs by a plurality of angularly related passages through which oil may circulate.

3. In a bearing, relatively rotatable bearing members including one or more bearing segments weakened at their backs by radial and circumferential passages through which oil may circulate.

4. In a bearing, relatively rotatable bearing members including one or more bearing segments provided with a plurality of open-ended grooves extending into the body of the segment from its rear surface.

5. In a bearing, relatively rotatable bearing members including one or more bearing segments having intersecting open-ended grooves extending into the body of the segment from its rear surface.

6. In a bearing, relatively rotatable bearing members including one or more bearing segments having radial and transverse open-ended grooves extending into the body of the segment from its rear surface.

7. In a bearing, relatively rotatable bearing members including one or more bearing segments having a plurality of grooves of different depths extending into the segment from its rear surface.

8. In a bearing, relatively rotatable bearing members including one or more bearing segments having a plurality of grooves in each of a plurality of angularly related directions extending into the segment from its rear surface.

9. In a bearing, relatively rotatable bearing members including one or more bearing segments, each of said segments being recessed at its back to receive a pressure-distributing block and provided with one or more slots through the portion of the segment surrounding said recess.

10. In a bearing, relatively rotatable bearing members including one or more bearing segments, each of said segments being recessed at its back to receive a pressure-distributing block and provided with one or more grooves which traverse the portion of the segment around said recess and project into the body of the segment forwardly of said recess.

11. In a bearing, relatively rotatable bearing members including one or more bearing segments, and a pressure-distributing block with which each segment has annular contact within the periphery of the segment, each segment being provided in its back with a plurality of passages through which oil may circulate.

12. In a bearing, relatively rotatable bearing members including one or more bearing segments, each of said segments having a recess at its rear and a pressure-distributing block mounted in said recess and engaging the forward wall thereof, each segment being provided with a plurality of oil passages through the segment forwardly of said recess.

13. In a bearing, relatively rotatable bearing members including one or more bearing segments, each of said segments having a recess at its rear and a pressure-distributing block mounted in said recess and engaging the forward wall thereof, each segment being provided with a plurality of grooves which weaken the segment around said recess and afford oil passages through the body of the segment forwardly of said recess.

14. In a bearing, relatively rotatable bearing members including one or more bearing segments, each of said segments having a recess in its back and being weakened around said recess, and a pressure-distributing block in each recess.

15. In a bearing, relatively rotatable bearing members including one or more bearing segments, each of said segments having a recess in its back and being weakened around and forwardly of said recess, and a pressure-distributing block in each recess.

16. In a bearing, relatively rotatable bearing members including one or more bearing segments, each of said segments having a recess in its back and one or more relatively deep slots which traverse the wall of the segment surrounding said recess, and a pressure-distributing block in each recess.

17. In a bearing, relatively rotatable bearing members including one or more bearing segments, each of said segments having a recess in its back and one or more relatively deep slots traversing the bottom of said recess and the wall surrounding said recess, and a pressure-distributing block in each recess.

18. In a bearing, relatively rotatable bearing members including one or more bearing segments, each of said segments being provided in its back with radial and circumferential passages through which oil may circulate, and a pressure-distributing block having an annular surface of engagement with each segment.

19. In a high speed bearing, relatively rotatable bearing members including one or more tiltably supported bearing segments each having its leading edge advanced with respect to its support to provide a short leading area and a long trailing area.

20. In a high speed bearing, relatively rotatable bearing members including one or more bearing segments, and mounting means tiltably engaging each segment between the leading edge and the center of figure of its bearing surface.

21. In a high speed bearing, relatively rotatable bearing members including one or more tiltably mounted bearing segments, each of said segments having its bearing face cut away adjacent its leading edge so that the center of figure of its bearing surface is advanced toward the trailing edge of the segment.

22. In a high speed bearing, relatively rotatable bearing members including one or more tiltable bearing segments, each of said segments having the leading edge of its bearing face so disposed that the center of figure of its bearing surface is on the trailing side of its support.

23. In a thrust bearing for speeds sufficiently high that substantial pressure is generated by the deflection of the moving lubricant by the bearing members, the combination of relatively rotatable bearing members including one or more tiltably mounted bearing shoes, each of said shoes having its leading edge located where the film pressure on a shoe whose deflection pressure is substantially zero tends to equal the said deflection pressure generated by one of said shoes of the high speed bearing.

24. In a thrust bearing for speeds sufficiently high that substantial pressure is generated by the deflection of the moving lubricant by the bearing members, the combination of relatively rotatable bearing members including one or more tiltably mounted bearing shoes, each of said shoes having its leading edge located where the film pressure on a shoe whose deflection pressure is substantially zero tends to equal the said deflection pressure generated by one of said shoes of the high speed bearing, and means for supporting said shoe substantially in line with the resultant of the film pressure.

25. In a high speed thrust bearing, the combination of relatively rotatable bearing members including one or more tiltably mounted bearing shoes, each of said shoes having its leading edge nearer to the axis of its support than its trailing edge.

26. In a thrust bearing for speeds sufficiently high that substantial pressure is generated by the deflection of the moving lubricant by the bearing members, the combination of relatively rotatable bearing members including one or more tiltably mounted bearing shoes, each of said shoes having its bearing surface shortened in a circumferential direction relatively to a shoe whose deflection pressure is substantially zero in proportion to the pressure developed by the deflection of lubricant in said high speed bearing, and means for supporting said shoe substantially in line with the resultant of the film pressure.

27. In a thrust bearing for speeds sufficiently high that substantial pressure is generated by the deflection of the moving lubricant by the bearing members, the combination of relatively rotatable bearing members including one or more tiltably mounted bearing shoes, each of said shoes having the leading edge of its bearing face cut away so that the center of figure of its bearing surface is displaced toward its trailing edge with respect to the center of the shoe body, and means for supporting said shoe body substantially in line with the resultant of the film pressure of said bearing surface.

28. In a high speed thrust bearing, the combination of relatively rotatable bearing members including one or more tiltably mounted bearing shoes, each of said shoes being supported nearer to its leading edge, for the normal direction of rotation, than to its trailing edge.

29. In a bearing, in combination with relatively rotatable bearing members including one or more bearing segments having bearing surfaces formed thereon, each of said segments being composed of metal of high heat conductivity to disseminate the heat rapidly.

30. In a bearing, an oil well and relatively rotatable bearing members in said oil well including one or more bearing segments, each segment being traversed at its back by a plurality of radially directed conduit-like passages formed in the body of the segment to permit oil to circulate therethrough and abstract heat therefrom.

31. In a bearing, an oil well and relatively rotatable bearing members in said oil well including one or more bearing segments, each segment being traversed at its back by a plurality of circumferentially directed conduit-like passages formed in the body of the segment to permit oil to circulate therethrough and abstract heat from the central portions of said body.

32. In a bearing, an oil well and relatively rotatable bearing members in said oil well including one or more bearing segments, each segment being traversed at its back by a plurality of angularly related conduit-like passages formed in the body of the segment to permit oil to circulate therethrough and abstract heat therefrom.

33. In a bearing, an oil well and relatively rotatable bearing members in said oil well including one or more bearing segments, each segment being traversed at its back by radial and right-angularly directed conduit-like passages formed in the body of the segment to permit oil to circulate therethrough and abstract heat therefrom.

34. In a bearing, an oil well and relatively rotatable bearing members in said oil well including one or more bearing segments, each segment being traversed at its back by a plurality of radially directed and a plurality of circumferentially directed conduit-like passages formed in the body of the segment to permit oil to circulate therethrough and abstract heat therefrom.

35. In a bearing, relatively rotatable bearing members including one or more bearing segments, each segment being traversed at its back by oil passages which weaken the segment to reduce distortion.

36. In a bearing, relatively rotatable bearing members including one or more tiltably mounted bearing segments, and mounting means therefor supporting each segment radially inside of the center of figure of its bearing surface.

37. In a bearing, relatively rotatable bearing members including one or more tiltably mounted bearing segments, and means for mounting each segment whereby the oil film pressures adjacent the radially inner and outer edges thereof shall be inversely as speeds adjacent said edges.

In testimony whereof I have signed this specification.

ALBERT KINGSBURY.